US012684564B2

(12) United States Patent
Mondet et al.

(10) Patent No.: US 12,684,564 B2
(45) Date of Patent: Jul. 14, 2026

(54) MANAGING UPLINK TRANSMISSION LATENCY

(71) Applicant: QUALCOMM Incorporated, San Diego, CA (US)

(72) Inventors: Mickael Mondet, Louannec (FR); Prashanth Haridas Hande, San Diego, CA (US); Hyun Yong Lee, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 824 days.

(21) Appl. No.: 18/159,657

(22) Filed: Jan. 25, 2023

(65) Prior Publication Data

US 2024/0251400 A1     Jul. 25, 2024

(51) Int. Cl.
   *H04W 72/1268*     (2023.01)
   *H04W 72/50*       (2023.01)
(52) U.S. Cl.
   CPC ..... *H04W 72/1268* (2013.01); *H04W 72/535* (2023.01)
(58) Field of Classification Search
   CPC ... H04W 72/21; H04W 72/512; H04W 72/11; H04W 72/20; H04W 72/1268;
   (Continued)

(56) References Cited

U.S. PATENT DOCUMENTS

2002/0131379 A1*  9/2002  Lee ...................... H04B 7/2618
                                                  370/335
2021/0014845 A1*  1/2021  Chae ................. H04W 72/0446
2022/0132555 A1*  4/2022  Blankenship ......... H04W 72/23

FOREIGN PATENT DOCUMENTS

TW        202044886 A  * 12/2020  ............ H04W 72/23
WO        2022131981 A1    6/2022

OTHER PUBLICATIONS

Interdigital Inc: "Discussion on XR-Specific Capacity Enhancements Techniques", 3GPP TSG RAN WG1 #111, R1-2211843, Type Discussion, FS NR_XR_ENH, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 7, 2022, 10 Pages, XP052222408, Section2.2, p. 3, Section 2.3, p. 3-p. 4.

(Continued)

*Primary Examiner* — David Q Nguyen
(74) *Attorney, Agent, or Firm* — Muncy, Geissler, Olds & Lowe, P.C.

(57)     ABSTRACT

Various aspects may include methods for managing uplink transmission latency. In some embodiments, a user equipment (UE) modem may determine for each of two or more initial offset times an average time between uplink data arrival times at the UE modem during a configured grant (CG) frame pattern and subsequent uplink slots, select an initial offset time corresponding to the shortest average time, and receiving uplink data at the UE modem for transmission to a communication network according to the selected initial offset time. In some embodiments, the UE modem may determine for each of two or more CG frame patterns, an average time between uplink data arrival times at the UE modem and subsequent uplink slots of the CG frame patterns, select a CG frame pattern corresponding to the shortest average time, and transmit the selected CG frame pattern to a communication network.

14 Claims, 13 Drawing Sheets

(58) Field of Classification Search
      CPC ........... H04W 72/0446; H04W 72/535; H04W
                      84/06; H04W 72/1284; H04W 72/14;
                                                  H04W 72/23
      USPC ........................................ 370/328, 329, 330
      See application file for complete search history.

(56)                   References Cited

OTHER PUBLICATIONS

International Search Report and Written Opinion—PCT/US2023/
081808—ISA/EPO—Mar. 4, 2024. 17 pages.
ZTE Corporation, et al., "Scheduling Enhancements for XR", 3GPP
TSG-RAN2#120, R2-2211527, Type Discussion, 3rd Generation
Partnership Project, Mobile Competence Centre, 650, Route Des
Lucioles, F-06921 Sophia-Antipolis Cedex, France, vol. 3GPP
RAN 2, No. Toulouse, FR, Nov. 14, 2022-Nov. 18, 2022, Nov. 4,
2022, XP052215634, Section 4.1.2, p. 4-p. 5.

* cited by examiner

Figure 2:
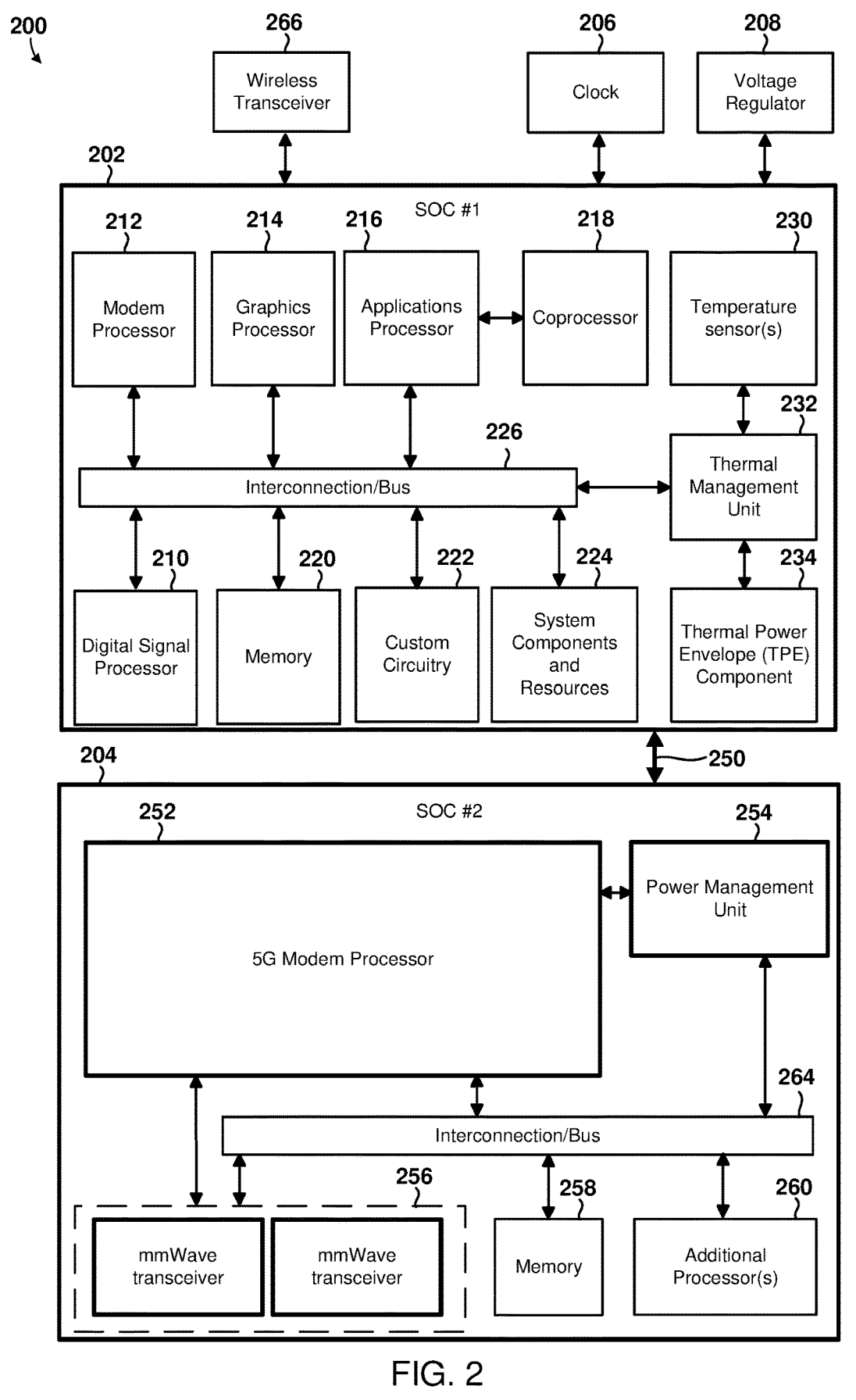

200

266
Wireless Transceiver

206
Clock

208
Voltage Regulator

202

SOC #1

212
Modem Processor

214
Graphics Processor

216
Applications Processor

218
Coprocessor

230
Temperature sensor(s)

226
Interconnection/Bus

232
Thermal Management Unit

210
Digital Signal Processor

220
Memory

222
Custom Circuitry

224
System Components and Resources

234
Thermal Power Envelope (TPE) Component

204

250

SOC #2

252
5G Modem Processor

254
Power Management Unit

264
Interconnection/Bus

256
mmWave transceiver mmWave transceiver

258
Memory

260
Additional Processor(s)

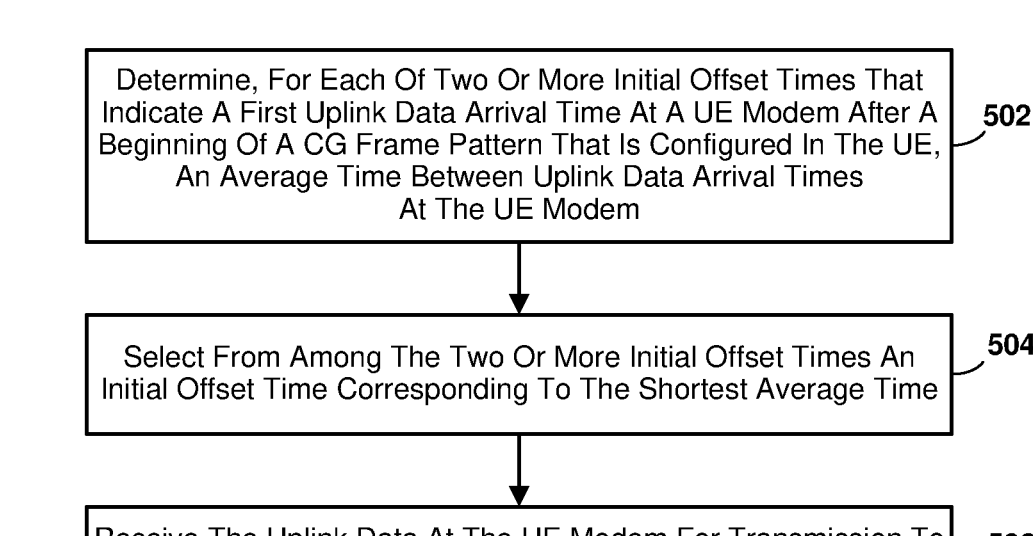

Determine, For Each Of Two Or More Initial Offset Times That
Indicate A First Uplink Data Arrival Time At A UE Modem After A
Beginning Of A CG Frame Pattern That Is Configured In The UE,
An Average Time Between Uplink Data Arrival Times
At The UE Modem          502

Select From Among The Two Or More Initial Offset Times An
Initial Offset Time Corresponding To The Shortest Average Time          504

Receive The Uplink Data At The UE Modem For Transmission To
A Communication Network According To The Selected Initial
Offset Time          506

FIG. 5A

500b
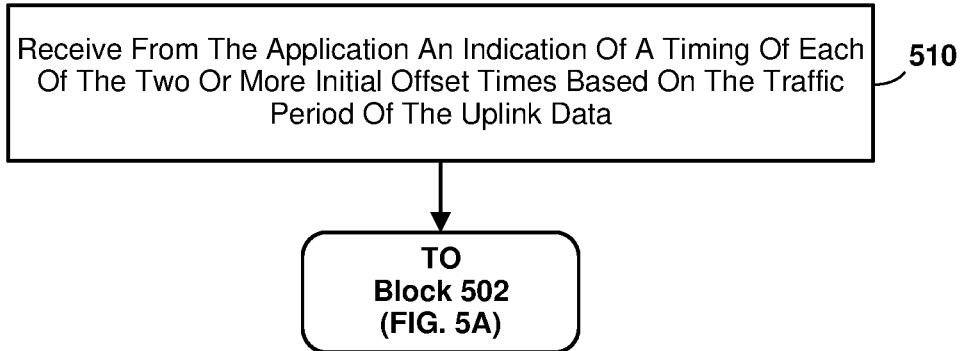
Receive From The Application An Indication Of A Timing Of Each Of The Two Or More Initial Offset Times Based On The Traffic Period Of The Uplink Data ⌐ 510
TO
Block 502
(FIG. 5A)
FIG. 5B 500c FROM
Block 504
(FIG. 5A)

Provide The Selected Initial Offset Time By The UE Modem To
An Application Executing In The UE                    520

Receive The Uplink Data From The Application At The UE
Modem According To The Selected Initial Offset Time      522

600a

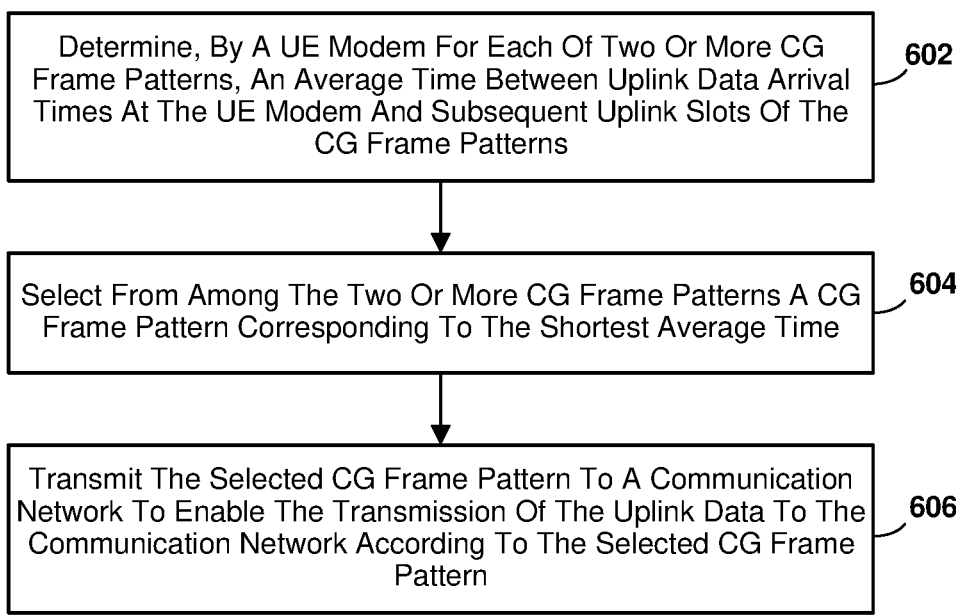

Determine, By A UE Modem For Each Of Two Or More CG Frame Patterns, An Average Time Between Uplink Data Arrival Times At The UE Modem And Subsequent Uplink Slots Of The CG Frame Patterns — 602

Select From Among The Two Or More CG Frame Patterns A CG Frame Pattern Corresponding To The Shortest Average Time — 604

Transmit The Selected CG Frame Pattern To A Communication Network To Enable The Transmission Of The Uplink Data To The Communication Network According To The Selected CG Frame Pattern — 606

FROM
Block 606
(FIG. 6A)

Receive From The Communication Network A CG Frame Pattern Configuration Following Transmission Of The Selected CG Frame Pattern To The Communication Network    610

MANAGING UPLINK TRANSMISSION LATENCY

BACKGROUND

Long Term Evolution (LTE), Fifth Generation (5G) New Radio (NR), and other communication technologies enable improved communication and data services. Some applications, such as online gaming and extended reality (XR) applications, utilize traffic flows with relatively short latency requirements to send and receive information. For such applications, audio, video, multimedia information may be conveyed in downlink data traffic, and information about inputs and/or orientation from a controller or XR hardware may be conveyed in uplink data traffic.

SUMMARY

Various aspects include methods performed by a user equipment (UE) for managing uplink transmission latency. Various aspects may include determining, for each of two or more initial offset times that indicate a first uplink data arrival time at a UE modem after a beginning of a configured grant (CG) frame pattern that is configured in the UE, an average time between uplink data arrival times at the UE modem during the CG frame pattern and subsequent uplink slots of the CG frame pattern, selecting from among the two or more initial offset times an initial offset time corresponding to the shortest average time, and receiving uplink data at the UE modem for transmission to a communication network according to the selected initial offset time. In some aspects, the average time between uplink data arrival times at the UE modem during the CG frame pattern and subsequent uplink slots of the CG frame pattern may include an average quantity of slots of the CG frame pattern. In some aspects, the CG frame pattern may be non-uniform.

In some aspects, the uplink data arrival times may be periodic according to a traffic period of the uplink data transmitted by an application to the UE modem. Some aspects may further include receiving by the UE modem from the application an indication of a timing of each of the two or more initial offset times based on the traffic period of the uplink data.

In some aspects, each of the two or more offset times may correspond to a traffic period of the uplink data. In some aspects, receiving the uplink data at the UE modem for transmission to the communication network according to the selected initial offset time may include providing the selected initial offset time by the UE modem to an application executing in the UE, and receiving the uplink data from the application at the UE modem according to the selected initial offset time.

Further aspects include methods performed by a UE for managing uplink transmission latency may include determining, by a user equipment (UE) modem for each of two or more configured grant (CG) frame patterns, an average time between uplink data arrival times at the UE modem and subsequent uplink slots of the CG frame patterns, selecting from among the two or more CG frame patterns a CG frame pattern corresponding to the shortest average time, and transmitting the selected CG frame pattern to a communication network to enable the transmission of uplink data to the communication network according to the selected CG frame pattern. In some aspects, determining, for each of the two or more CG patterns, the average time between uplink data arrival times at the UE modem and the subsequent CG of each CG pattern may include determining a length of each of the two or more CG patterns based on a length of a frame pattern and a traffic period of the uplink data.

Some aspects may further include receiving from the communication network a CG frame pattern configuration following transmission of the selected CG frame pattern to the communication network.

In some aspects, transmitting the selected CG frame pattern to the communication network may include transmitting to the communication network a length of the CG frame pattern and a bitmap indicating the CG frame pattern. In some aspects, transmitting the selected CG frame pattern to the communication network may include transmitting the selected CG frame pattern to the communication network via L3 signaling or L2 signaling.

Further aspects include a UE having a processor configured to perform one or more operations of any of the methods summarized above. Further aspects include processing devices for use in a UE configured with processor-executable instructions to perform operations of any of the methods summarized above. Further aspects include a non-transitory processor-readable storage medium having stored thereon processor-executable instructions configured to cause a processor of a UE to perform operations of any of the methods summarized above. Further aspects include a UE having means for performing functions of any of the methods summarized above. Further aspects include a system on chip for use in a UE and that includes a processor configured to perform one or more operations of any of the methods summarized above.

BRIEF DESCRIPTION OF THE DRAWINGS

FIG. 2 is a component block diagram illustrating an example computing and wireless modem system suitable for implementing any of the various embodiments.

FIG. 5A is a process flow diagram illustrating a method that may be performed by a processor of a modem of a UE for managing uplink transmission latency in accordance with various embodiments.

FIGS. 5B and 5C are process flow diagrams illustrating operations that may be performed by a processor of a modem of a UE as part of the method for managing uplink transmission latency in accordance with various embodiments.

FIG. 6A is a process flow diagram illustrating a method that may be performed by a processor of a modem of a UE for managing uplink transmission latency in accordance with various embodiments.

DETAILED DESCRIPTION

Figure 1A:
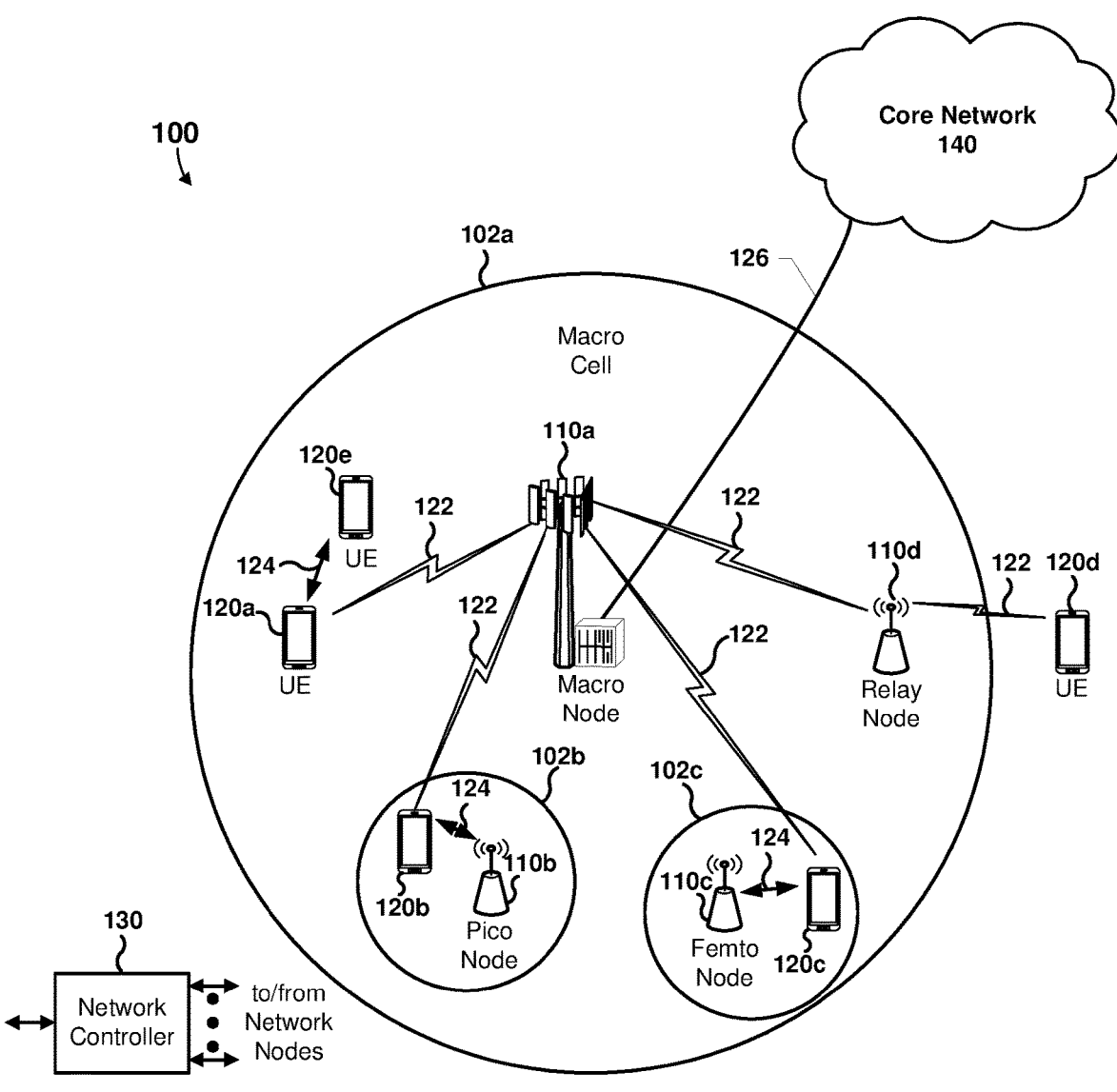
FIG. 1A is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include a UE in a data streaming session using a first communication link identifying parameters of a second communication link in response to the data streaming session changing from the first communication link to the second communication link. The UE may use identified parameters of the second communication link to select an initial congestion window size that is larger than a default congestion window size and then apply the selected initial congestion window size to the data streaming session. Various embodiments enable the UE to increase the efficiency of streaming data packet communication when the UE is mobile, such as when the UE changes wireless communication links frequently. This may improve the operation and performance of streaming data applications and services when the UE changes data connections.

The term "user equipment" (UE) is used herein to refer to any one or all of wireless communication devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, extended reality (XR) head-mounted displays and glasses, entertainment devices (for example, wireless gaming controllers, music and video players, satellite radios, etc.), wireless router devices, medical devices and equipment, wearable devices including smart watches, smart clothing, smart glasses, and smart wrist bands, wireless-network enabled Internet of Things (IoT) devices including smart meters/sensors, industrial manufacturing equipment, large and small machinery and appliances for home or enterprise use, wireless communication elements within vehicles, wireless devices affixed to or incorporated into various mobile platforms, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement Enhanced Data rates for Global System for Mobile communications (GSM) Evolution (EDGE). In another example, an OFDMA network may implement Evolved UTRA (E-UTRA) (including LTE standards), Institute of Electrical and Electronics Engineers (IEEE) 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

Some applications, such as online gaming and XR applications (which includes virtual reality (VR), augmented reality (AR), mixed reality (MR), and other similar applications), utilize traffic flows with relatively short latency requirements to send and receive information. For such applications, audio, video, multimedia information may be conveyed in downlink data traffic, and information about inputs, position information, and/or orientation information from a controller or XR hardware ("pose information") may be conveyed in uplink data traffic. In some embodiments, such downlink traffic may be quasi-periodic encoded video with a burst every frame at a rate of one frame per second (fps) or two possibly staggered "eye-buffers" per frame at one per every two fps. When the network receives the uplink pose information flow, a network computing device uses this information to generate a corresponding video frame.

The process of converting motion to rendered video is sometimes referred to as "motion-to-photon" (M2F2P). In some embodiments, a user's experience (UX) with a low latency application may depend at least in part on the round trip time (RTT) between uplink packets conveying pose or controller information and downlink frame packets, which may have a strict latency requirement, such as an RTT requirement of less than 20 milliseconds. Such uplink packets may be relatively small (e.g., approximately 100 bytes), but are typically transmitted relatively frequently, and may have a cadence of, for example, approximately 500 Hertz (Hz). Due to such strict latency requirements, one efficient way to transmit this type of small uplink traffic is through the use of configured grants (CG) that schedule uplink transmission time slots, which may be referred to as uplink transmission resources.

Figure 4A:
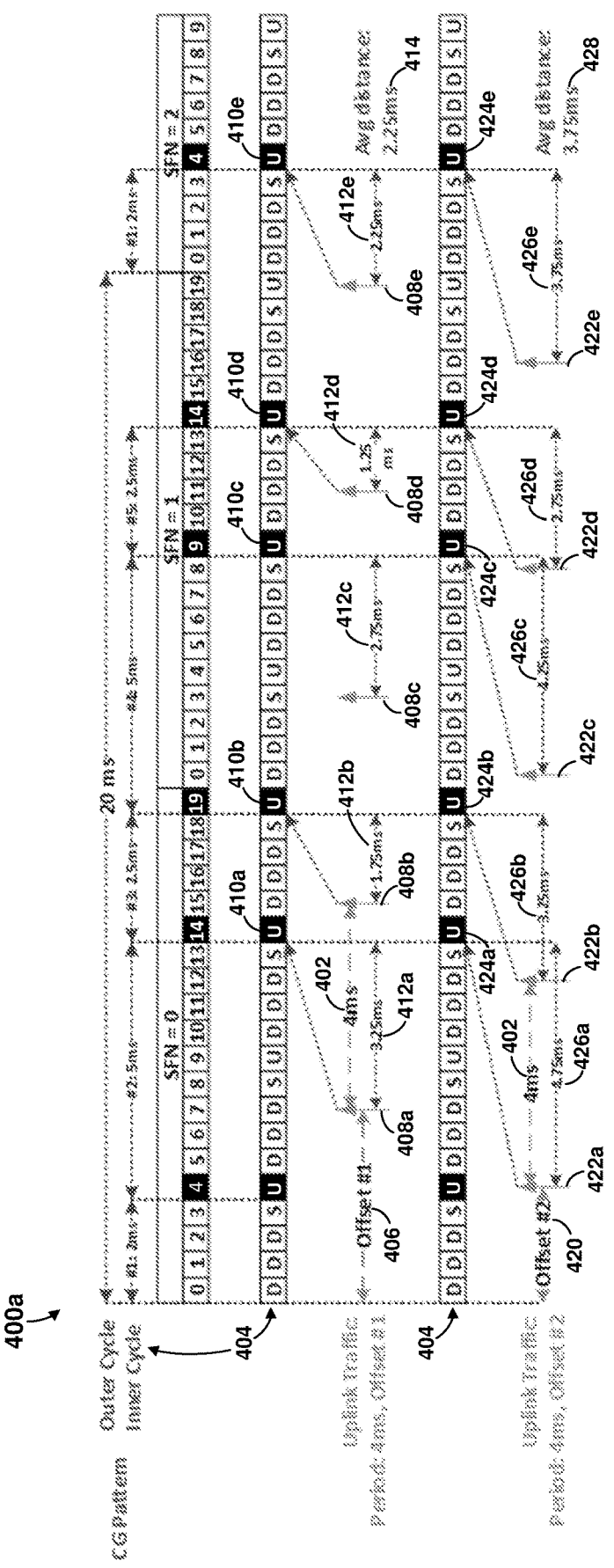
FIG. 4A is a timing diagram illustrating a method for managing uplink transmission latency according to various embodiments.
Figure 4B:
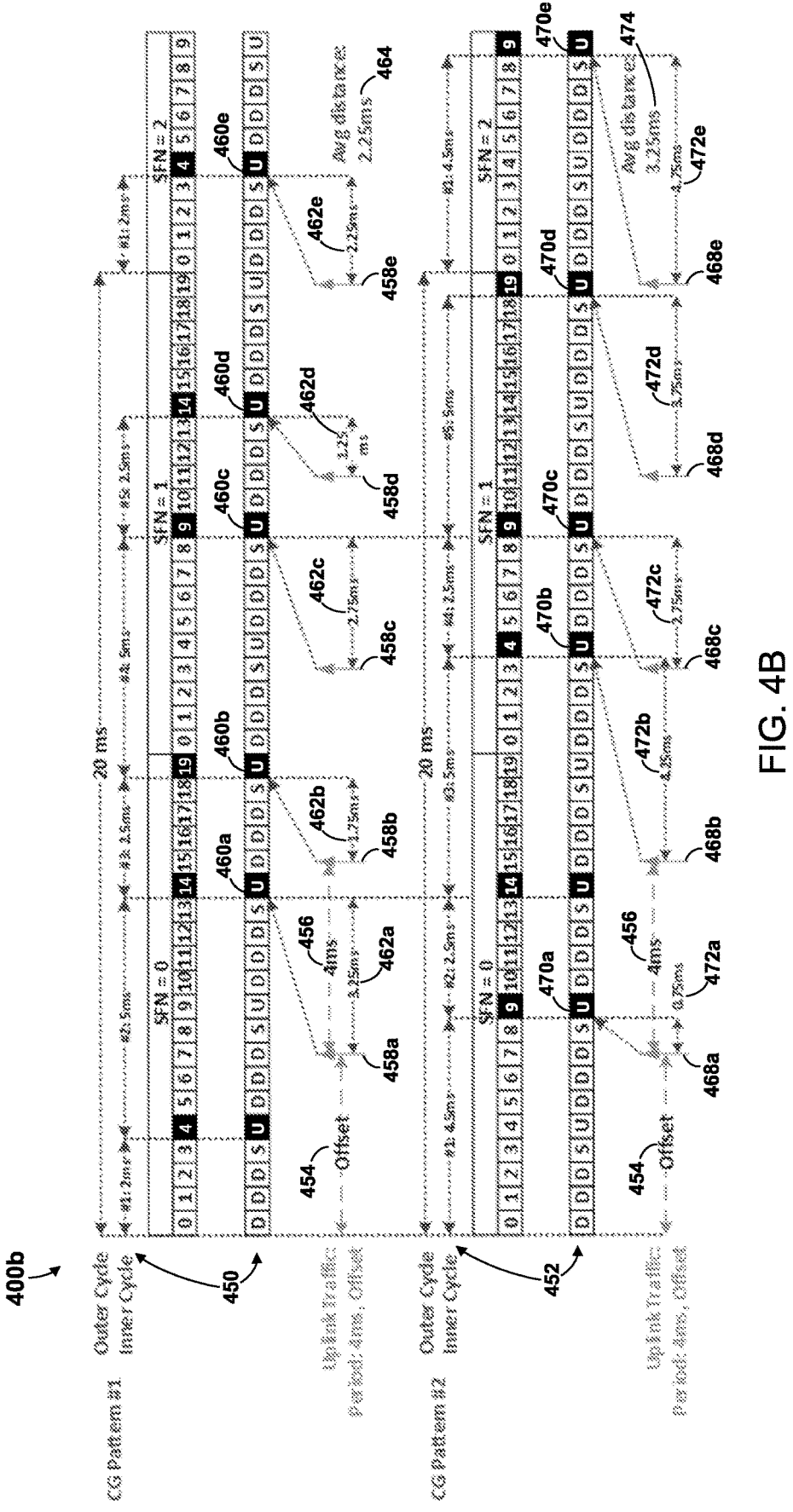
FIG. 4B is a timing diagram illustrating a method 400b for managing uplink transmission latency according to various embodiments.

As defined for 5G by the 3rd Generation Partnership Project (3GPP), the use of CG scheduling enables a communication network to pre-allocate uplink transmission resources to the UE, reducing or eliminating a need for the UE to request uplink resources for each packet transmission. The communication network may indicate a CG period via a ConfiguredGrantConfig Radio Resource Control (RRC) information element (IE) or another suitable IE. In some embodiments, configured grants may include a slot pattern or slot configuration provided by the communication network to the UE (referred to as a "CG frame pattern"). In support of multimedia services, such as cloud gaming and XR services, CG frame patterns may be non-uniform and may be configured in different ways, such as according to an outer-cycle and an inter-cycle, a period defined based on a multimedia data cadence, irrational number, or another means of configuration. A CG frame pattern may include one or more uplink slots that occur non-periodically or at non-uniform times during the CG frame. In some embodiments, a CG frame pattern, as illustrated in FIGS. 4A and 4B, such as DDDSU or DDDSUUDDDD, in which "D" indicates a downlink slot, "U" indicates an uplink slot, and "S" indicates a special slot that may be used as an uplink slot or a downlink slot.

To meet a strict latency requirement for a low latency application, a UE may attempt to reduce an amount of time between when data is received from an application (e.g., an XR application) by a modem of the UE and is stored in a buffer (or other memory) and when the data is transmitted to the communication network. In some embodiments, the UE may be configured to perform operations to reduce such buffer storage time by reducing the amount of time between the arrival of data at the modem and the next available uplink slot of a CG frame pattern.

In some embodiments, the modem of the UE (e.g., a modem processor) may be configured to determine, based on a known CG frame pattern, suitable arrival times of uplink data at the UE modem. In some embodiments, the modem of the UE may be configured to determine, for each of two or more initial offset times that indicate a first uplink data arrival time at the modem after a beginning of a CG frame pattern that is configured in the UE, an average time between uplink data arrival times at the UE modem during the CG frame pattern and subsequent uplink slots of the CG frame pattern. The modem may select from among the two or more initial offset times an initial offset time corresponding to the shortest average time, and may receive the uplink data for transmission to a communication network according to the selected initial offset time. In some embodiments, the average time between uplink data arrival times at the UE modem during the CG frame pattern and subsequent uplink slots of the CG frame pattern may include an average quantity of slots of the CG frame pattern. In some embodiments, the CG frame pattern may be non-uniform.

For example, the modem may be configured to calculate the average time between uplink data arrival times at the UE modem during the CG frame pattern and subsequent uplink slots of the CG frame pattern as a function of the initial offset times. In some embodiments, such calculation may be expressed as avgDistance=f(initialOffset), in which avgDistance represents an average time, and initialOffset represents an initial offset time. In such embodiments, the modem may calculate a number (N) of uplink data arrival times (N_arrivalTimes) occurring during the CG frame pattern. Each arrival time may be expressed as j, from 1 to N_arrivalTimes. The modem may calculate a timing (for example, a slot position, or a timing of a slot) of each arrival time j relative to the start of the CG frame pattern, which may be expressed as Pos_j=initialOffset+(j−1)*TrafficPeriod, in which TrafficPeriod represents a period of the uplink data traffic (e.g., packets). The modem may calculate a time or "distance" dj from each Pos_j to a subsequently occurring uplink slot (a CG uplink opportunity). In some embodiments, the subsequently occurring uplink slot may be at least k2 min slots after the Pos_j. The calculation by the modem of the average time between uplink data arrival times at the UE modem during the CG frame pattern and subsequent uplink slots of the CG frame pattern may be expressed as avgDistance=(Σdj)/N_arrivalTimes.

In some embodiments, the modem may calculate an avgDistance(i) for all possible initial offsets (i) during the uplink traffic period. In some embodiments, the uplink data arrival times may be periodic according to a traffic period of the uplink data transmitted by an application to the UE modem. In some embodiments, the modem may calculate the uplink data arrival times using a fixed step (e.g., one slot) or a configurable number of steps that may be provided by the application. In such embodiments, the modem may receive from the application an indication of a timing of each of the two or more initial offset times based on the traffic period of the uplink data. In some embodiments, the modem may receive from the application an indication of possible timing of each possible initial offset. For example, if an uplink data traffic period is 4 ms, possible initial offsets may be {0, 0.5, 1, 1.5, 2, 2.5, 3, 3.5}. In some embodiments, each of the two or more offset times may correspond to a traffic period of the uplink data.

In some embodiments, the modem may provide to the application one or more parameters, such as the selected initial offset and/or the average time between uplink data arrival times at the UE modem during the CG frame pattern and subsequent uplink slots of the CG frame pattern, via a cross-layer Application Programming Interface (API). In response to receiving the one or more parameters, the application may adjust the timing of when uplink data is provided to the modem, such as by adjusting an initial offset timing. In some embodiments, the application may select an initial offset that reduces the average time. In some embodiments, the application may select an initial offset that minimizes the average time.

In some embodiments, the application may enable or disable (e.g., via cross-layer API signaling) one or more operations of the modem for determining the average time between the uplink data arrival times at the UE modem during the CG frame pattern and subsequent uplink slots of the CG frame pattern. In some embodiments, the application may provide the modem with time interval(s) (e.g., 0.5 ms steps) that the modem may use to determine one or more initial offset times. In some embodiments, the UE modem may provide the selected initial offset time by the UE modem to the application executing in the UE. In such embodiments, the UE modem may receive the uplink data from the application at the UE modem according to the selected initial offset time. In some embodiments, the modem of the UE may be configured to determine, based on arrival times of uplink data at the UE modem, a suitable CG frame pattern so as to reduce uplink data transmission latency.

In some embodiments, the modem of the UE (e.g., a modem processor) may be configured to determine a suitable CG frame pattern based on one or more known traffic arrival times. In some embodiments, the modem of the UE may be configured to determine, for each of two or more CG frame patterns, an average time between uplink data arrival times at the UE modem and subsequent uplink slots of the CG frame patterns. In some embodiments, the modem may select from among the two or more CG frame patterns a CG frame pattern corresponding to the shortest average time, and may transmit the selected CG frame pattern to a communication network to enable the transmission of the uplink data to the communication network according to the selected CG frame pattern.

For example, the modem may be configured to calculate a length (duration) of the CG frame pattern (CG Length) as a lowest common multiple of a length (duration) of the CG frame pattern (e.g., 2.5 ms for a DDDSU pattern) and the uplink data traffic period. In some embodiments, the modem may initialize (or generate) a bitmap (CG_Bitmap) having a length that indicates a number of uplink (U) slots during the CG frame pattern. The generated bitmap may indicate the selected CG frame pattern. It some embodiments, each bit of the bitmap may represent a candidate slot for CG uplink transmission in the CG frame pattern. The modem may calculate a number of arrival times (N) of uplink data (N_arrivalTimes) that may occur during the CG frame pattern. In some embodiments, for each arrival time j (from 1 to N_arrivalTimes), the modem may calculate a timing of each arrival time j relative to the start of the CG frame pattern, which may be expressed as $Pos\_j=InitialOffset+(j-1)*TrafficPeriod$. In some embodiments, the modem may determine a next uplink (U) slot that is at least k2 min slots after Posj (modulo the length of the CG frame pattern). In some embodiments, the modem may set the corresponding bit in CG_Bitmap to 1.

In some embodiments, the modem may determine a length of each of the two or more CG patterns based on a length of a frame pattern and a traffic period of the uplink data. In some embodiments, the modem may receive from the communication network a CG frame pattern configuration following transmission of the selected CG frame pattern to the communication network, for example, via an RRC Reconfiguration message. In some embodiments, the communication network may use the bitmap (including the bitmap length) for the configuration of the CG frame pattern. In some embodiments, the modem may transmit to the communication network a length of the CG frame pattern and a bitmap indicating the CG frame pattern. In some embodiments, the modem may transmit the selected CG frame pattern to the communication network via L3 signaling or L2 signaling.

Various embodiments improve data communications in applications in which transmission delays (latency) should be reduced by enabling a UE to determine an appropriate uplink data traffic arrival time when a CG frame pattern is known to the UE. Various embodiments enable the UE to determine an appropriate CG frame pattern when the uplink data traffic arrival time is known to the UE. Various embodiments enable the UE to meet a strict latency requirement of a low latency application by reducing an amount of time that data which arrives at a modem of the UE is stored in a buffer (or other memory) before being transmitted to the communication network.

FIG. 1A is a system block diagram illustrating an example communications system 100 suitable for implementing any of the various embodiments. The communications system 100 may be a 5G New Radio (NR) network, or any other suitable network such as a Long Term Evolution (LTE) network. While FIG. 1A illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of UEs (illustrated as UEs 120a-120e in FIG. 1A). The communications system 100 also may include a number of network devices 110a, 110b, 110c, and 110d and other network entities, such as base stations and network nodes. A network device is an entity that communicates with UEs, and in various embodiments may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. In various communication network implementations or architectures, a network device may be implemented as an aggregated base station, as a disaggregated base station, an integrated access and backhaul (IAB) node, a relay node, a sidelink node, etc., such as a virtualized Radio Access Network (vRAN) or Open Radio Access Network (O-RAN). Also, in various communication network implementations or architectures, a network device (or network entity) may be implemented in an aggregated or monolithic base station architecture, or alternatively, in a disaggregated base station architecture, may include one or more of a Centralized Unit (CU), a Distributed Unit (DU), a Radio Unit (RU), a near-real time (RT) RAN intelligent controller (RIC), or a non-real time RIC. Each network device may provide communication coverage for a particular geographic area. In 3GPP, the term "cell" can refer to a coverage area of a network device, a network device subsystem serving this coverage area, or a combination thereof, depending on the context in which the term is used. The core network 140 may be any type core network, such as an LTE core network (e.g., an evolved packet core (EPC) network), 5G core network, etc.

A network device 110a-110d may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A network device for a macro cell may be referred to as a macro node or macro base station. A network device for a pico cell may be referred to as a pico node or a pico base station. A network device for a femto cell may be referred to as a femto node, a femto base station, a home node or home network device. In the example illustrated in FIG. 1A, a network device 110a may be a macro node for a macro cell 102a, a network device 110b may be a pico node for a pico cell 102b, and a network device 110c may be a femto node for a femto cell 102c. A network device 110a-110d may support one or multiple (for example, three) cells. The terms "network device," "network node," "eNB," "base station," "NR BS," "gNB," "TRP," "AP," "node B," "5G NB," and "cell" may be used interchangeably herein.

In some examples, a cell may not be stationary, and the geographic area of the cell may move according to the location of a network device, such as a network node or mobile network device. In some examples, the network devices 110a-110d may be interconnected to one another as well as to one or more other network devices (e.g., base stations or network nodes (not illustrated)) in the communications system 100 through various types of backhaul interfaces, such as a direct physical connection, a virtual network, or a combination thereof using any suitable transport network The network device 110a-110d may communicate with the core network 140 over a wired or wireless communication link 126. The UE 120a-120e may communicate with the network node 110a-110d over a wireless communication link 122. The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay network device 110d). A relay station is an entity that can receive a transmission of data from an upstream station (for example, a network device or a UE) and transmit the data to a downstream station (for example, a UE or a network device). A relay station also may be a UE that can relay transmissions for other UEs. In the example illustrated in FIG. 1A, a relay station 110d may communicate with macro the network device 110a and the UE 120d in order to facilitate communication between the network device 110a and the UE 120d. A relay station also may be referred to as a relay network device, a relay base station, a relay, etc.

The communications system 100 may be a heterogeneous network that includes network devices of different types, for example, macro network devices, pico network devices, femto network devices, relay network devices, etc. These different types of network devices may have different transmit power levels, different coverage areas, and different impacts on interference in communications system 100. For example, macro nodes may have a high transmit power level (for example, 5 to 40 Watts) whereas pico network devices, femto network devices, and relay network devices may have lower transmit power levels (for example, 0.1 to 2 Watts).

A network controller 130 may couple to a set of network devices and may provide coordination and control for these network devices. The network controller 130 may communicate with the network devices via a backhaul. The network devices also may communicate with one another, for example, directly or indirectly via a wireless or wireline backhaul.

The UEs 120a, 120b, 120c may be dispersed throughout communications system 100, and each UE may be stationary or mobile. A UE also may be referred to as an access terminal, a terminal, a mobile station, a subscriber unit, a station, wireless device, etc.

A macro network device 110a may communicate with the communication network 140 over a wired or wireless communication link 126. The UEs 120a, 120b, 120c may communicate with a network device 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per UE. Multi-layer transmissions with up to 2 streams per UE may be supported. Aggregation of multiple cells may be supported with up to eight serving cells. Alternatively, NR may support a different air interface, other than an OFDM-based air interface.

Some UEs may be considered machine-type communication (MTC) or evolved or enhanced machine-type communication (eMTC) UEs. MTC and eMTC UEs include, for example, robots, remote devices, sensors, meters, monitors, location tags, etc., that may communicate with a network device, another device (for example, remote device), or some other entity. A wireless computing platform may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. The UE 120a-120e may be included inside a housing that houses components of the UE 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an EPC network) in a 5G NSA network. Other example network configurations may include a 5G standalone (SA) network in which a 5G/NR RAN connects to a 5G core network.

In some implementations, two or more UEs 120a-120e (for example, illustrated as the UE 120a and the UE 120e) may communicate directly using one or more sidelink channels 124 (for example, without using a network node 110a-110d as an intermediary to communicate with one another). For example, the UEs 120a-120e may communicate using peer-to-peer (P2P) communications, device-to-device (D2D) communications, a mesh network, or similar networks, a vehicle-to-everything (V2X) protocol (which may include a vehicle-to-vehicle (V2V) protocol, a vehicle-to-infrastructure (V2I) protocol, or a similar protocol), or combinations thereof. In this case, the UE 120a-120e may perform scheduling operations, resource selection operations, as well as other operations described elsewhere herein as being performed by the network node 110a-110d.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or components) performing base station functionality, may be implemented in an aggregated or disaggregated architecture. For example, a base station (such as a Node B (NB), evolved NB (eNB), NR BS, 5G NB, access point (AP), a transmit receive point (TRP), or a cell, etc.) may be implemented

12 mented as an aggregated base station (also known as a standalone BS or a monolithic BS) or as a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CUs, DUs and RUs also can be implemented as virtual units, referred to as a virtual central unit (VCU), a virtual distributed unit (VDU), or a virtual radio unit (VRU).

Base station-type operations or network design may consider aggregation characteristics of base station functionality. For example, disaggregated base stations may be utilized in an integrated access backhaul (IAB) network, an open radio access network (O-RAN) (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 1B:
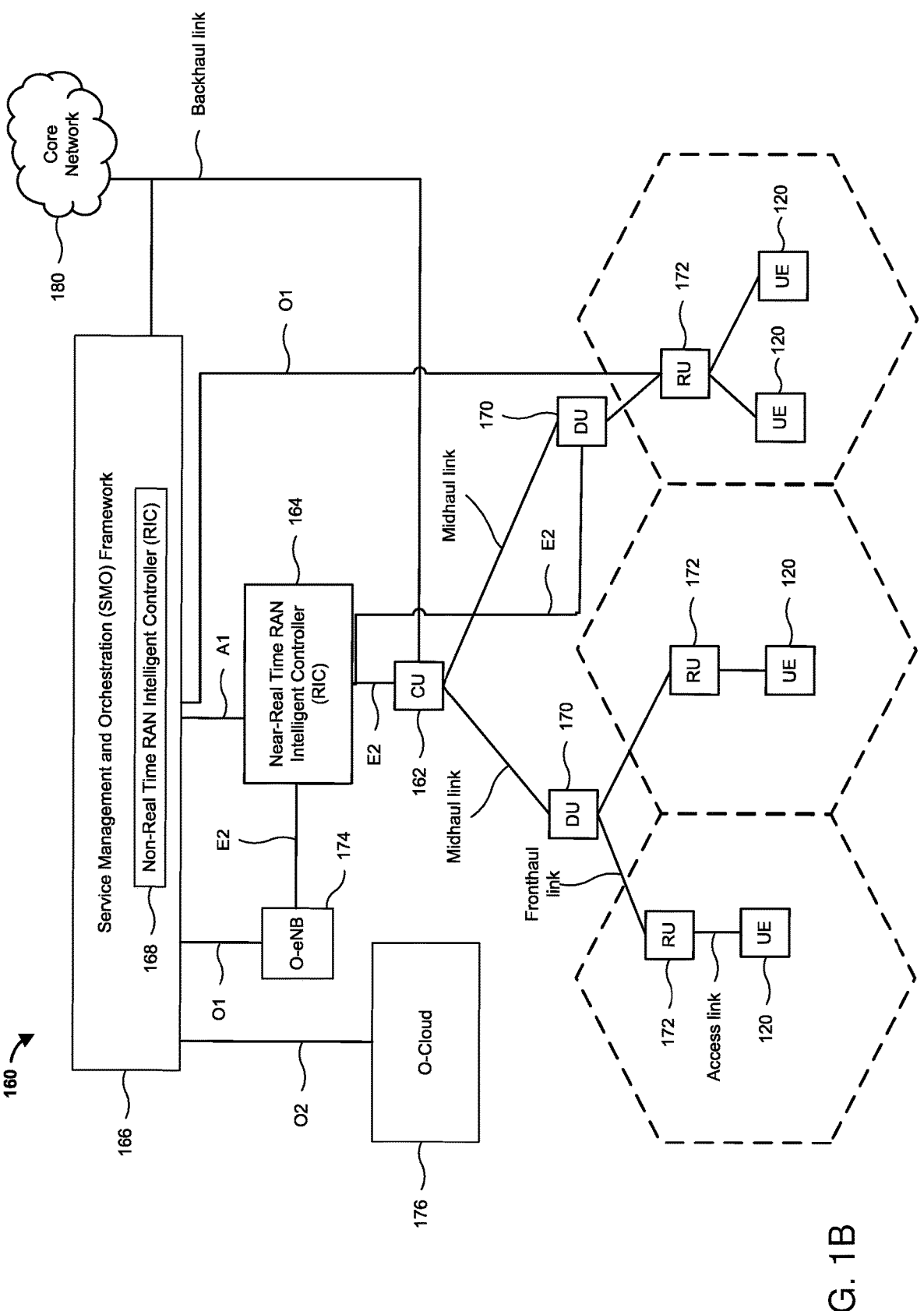
FIG. 1B is a system block diagram illustrating an example disaggregated base station architecture suitable for implementing any of the various embodiments.

FIG. 1B is a system block diagram illustrating an example disaggregated base station 160 architecture suitable for implementing any of the various embodiments. With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUs) 172 via respective fronthaul links. The RUs 172 may communicate with respective UEs 120 via one or more radio frequency (RF) access links. In some implementations, the UE 120 may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration. The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 172 may be implemented to handle over the air (OTA) communication with one or more UEs 120. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based RAN architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs

14

164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be configured to tune RAN behavior or performance. For example, the Non-RT RIC 168 may monitor long-term trends and patterns for performance and employ AI/ML models to perform corrective actions through the SMO Framework 166 (such as reconfiguration via O1) or via creation of RAN management policies (such as A1 policies).

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1A-2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from a UE (e.g., 120a-120e) or a network device (e.g., 110a-110d). In some implementations, the first SOC 202 may operate as central processing unit (CPU) of the UE that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), and/or very high frequency short wavelength (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a UE. The system components and resources 224 and/or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (such as CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
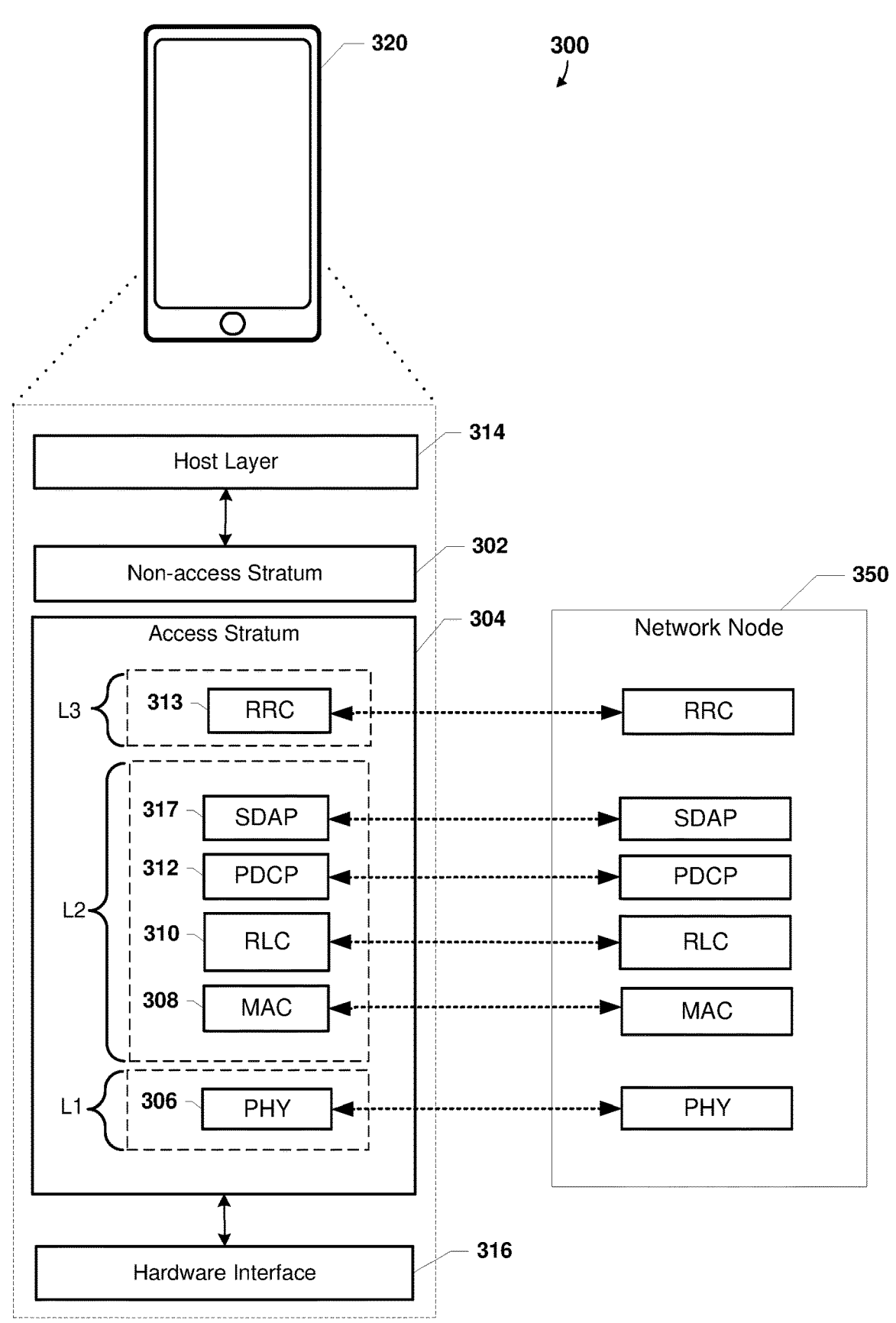
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments.

With reference to FIGS. 1A-3, the UE 320 may implement the software architecture 300 to facilitate communication between a UE 320 (e.g., the UE 120a-120e, 200) and the network device 350 (e.g., the network device 110a-110d) of a communication system (e.g., 100). In various embodiments, layers in software architecture 300 may form logical connections with corresponding layers in software of the network device 350. The software architecture 300 may be distributed among one or more processors (e.g., the processors 212, 214, 216, 218, 252, 260). While illustrated with respect to one radio protocol stack, in a UE having a multi-subscriber identity module (SIM), the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the UE (such as SIM(s) 204) and its core network 140. The AS 304 may include functions and protocols that support communication between a SIM(s) (such as SIM(s) 204) and entities of supported access networks (such as a network device, network node, RU, base station, etc.). In particular, the AS 304 may include at least three layers (Layer 1, Layer 2, and Layer 3), each of which may contain various sublayers.

In the user and control planes, Layer 1 (L1) of the AS 304 may be a physical layer (PHY) 306, which may oversee functions that enable transmission and/or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the UE 320 and the network node 350 over the physical layer 306. In some implementations, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer, each of which form logical connections terminating at the network node 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the UE 320 and the network node 350.

In various embodiments, the SDAP sublayer 317 may provide mapping between Quality of Service (QoS) flows and data radio bearers (DRBs). In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the UE 320. In some implementations, application-specific functions provided by the at least one host layer 314 may provide an interface between the software architecture and the general purpose processor (e.g., 202).

In other implementations, the software architecture 300 may include one or more higher logical layers (such as transport, session, presentation, application, etc.) that provide host layer functions. For example, in some implementations, the software architecture 300 may include a network layer (such as Internet Protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

In various network implementations or architectures, in the network device 350 the different logical layers 308-317 may be implemented in an aggregated or monolithic base station architecture, or alternatively, in a disaggregated network device architecture, and various logical layers may implemented in one or more of a CU, a DU, an RU, a Near-RT RAN Intelligent Controller (RIC), or a Non-Real Time (Non-RT) RIC. Further, the network device 350 may be implemented as an aggregated base station, as a disaggregated base station, an integrated access and backhaul (IAB) node, a relay node, a sidelink node, etc.

FIG. 4A is a timing diagram illustrating a method 400a for managing uplink transmission latency according to various embodiments. In some embodiments, a modem (e.g., 252) of a UE (e.g., 120a-120e, 200, 320) may be configured to determine an appropriate traffic arrival time based on a determined CG frame pattern.

In some embodiments, uplink traffic (e.g., uplink traffic for an online gaming or XR application) may have an uplink traffic period 402 of 4 ms. In this example, the UE has been configured by the communication network with a CG frame pattern 404 that is suitable for the 4 ms uplink traffic period 402. In various embodiments, the UE (e.g., the UE modem)

may be configured to determine an average time between uplink data arrival times at the UE modem during the CG frame pattern 404 and subsequent uplink slots of the CG frame pattern for each of two or more initial offset times that indicate a first uplink data arrival time at the UE modem.

For example, for a first initial offset time 406 ("Offset #1"), the UE may determine uplink data arrival times 408a, 408b, 408c, 408d, and 408e. The UE may determine an amount of time (also referred to as a distance in terms of slots, or a distance in terms of time quantity) between the uplink data arrival times 408a, 408b, 408c, 408d, and 408e and a corresponding uplink slot (U) 410a, 410b, 410c, 410d, 410e subsequent to each of the uplink data arrival times 408a, 408b, 408c, 408d, and 408e. For example, the UE may determine that: the amount of time between the uplink data arrival time 408a and the subsequent uplink slot 410a is 3.25 ms 412a; the amount of time between the uplink data arrival time 408b and the subsequent uplink slot 410b is 1.75 ms 412b; the amount of time between the uplink data arrival time 408c and the subsequent uplink slot 410c is 2.75 ms 412c; the amount of time between the uplink data arrival time 408d and the subsequent uplink slot 410d is 1.25 ms 412d; and the amount of time between the uplink data arrival time 408e and the subsequent uplink slot 410e is 2.25 ms 412e. Based on the amounts of time 412a-412e between the uplink data arrival times 408a-408e and the subsequent uplink slots 410a-410e, the UE may determine an average time 2.25 ms 414, which represents the average time between the uplink data arrival times 408a-408e at the UE modem during the CG frame pattern 404 and subsequent uplink slots 410a-410e of the CG frame pattern 404.

Continuing this example, for a second initial offset time 420 ("Offset #2"), the UE may determine uplink data arrival times 422a, 422b, 422c, 422d, and 422e. The UE may determine an amount of time (also referred to as a distance in terms of slots, or a distance in terms of time quantity) between the uplink data arrival times 422a, 422b, 422c, 422d, and 422e and a corresponding uplink slot (U) 424a, 424b, 424c, 424d, 424e subsequent to each of the uplink data arrival times 422a, 422b, 422c, 422d, and 422e. For example, the UE may determine that: the amount of time between the uplink data arrival time 422a and the subsequent uplink slot 424a is 4.75 ms 426a; the amount of time between the uplink data arrival time 422b and the subsequent uplink slot 424b is 3.25 ms 426b; the amount of time between the uplink data arrival time 422c and the subsequent uplink slot 424c is 4.25 ms 426c; the amount of time between the uplink data arrival time 422d and the subsequent uplink slot 424d is 2.75 ms 426d; and the amount of time between the uplink data arrival time 422e and the subsequent uplink slot 424e is 3.75 ms 426e. Based on the amounts of time 426a-426e between the uplink data arrival times 422a-422e and the subsequent uplink slots 424a-424e, the UE may determine an average time 3.75 ms 428, which represents the average time between the uplink data arrival times 422a-422e at the UE modem during the CG frame pattern 404 and subsequent uplink slots 424a-424e of the CG frame pattern 404.

The UE may determine that the shortest average time (2.25 ms 414) is associated with the first initial offset time 406 (Offset #1). The UE may select from the among the two initial offset times 406, 420 the initial offset time corresponding to the shortest average time (i.e., initial offset time 406). In some embodiments, the UE modem may provide the selected initial offset time 406 to an application executing in the UE that sends the uplink data to the UE modem. The UE modem may receive the uplink data for transmission to a communication network according to the selected initial offset time 406. For conciseness and clarity, operations performed by the UE with respect to two offset times (406, 420) are illustrated in FIG. 4A, but this is not intended as a limitation because the UE may perform similar operations for more offset times.

In some embodiments, the UE modem may be configured to calculate the average times (e.g., 414, 428) between uplink data arrival times at the UE modem during the CG frame pattern and subsequent uplink slots of the CG frame pattern as a function of the initial offset times. In some embodiments, this calculation may be expressed as avgDistance=f(initialOffset), in which avgDistance represents the average time, and initialOffset represents an initial offset time. In such embodiments, the UE modem may calculate a number (N) of uplink data arrival times (N_arrivalTimes) occurring during the CG frame pattern. Each arrival time may be expressed as j, from 1 to N_arrivalTimes. The UE modem may calculate a timing (for example, a slot position, or a timing of a slot) of each arrival time j relative to the start of the CG frame pattern, which may be expressed as Pos_j=initialOffset+(j–1)*TrafficPeriod, in which TrafficPeriod represents a period of the uplink data traffic (e.g., packets). The UE modem may calculate a distance dj from each Pos_j to a subsequently occurring uplink slot (a CG uplink opportunity). In some embodiments, the subsequently occurring uplink slot may be at least k2 min slots after the Pos_j. The calculation by the UE modem of the average time between uplink data arrival times at the UE modem during the CG frame pattern and subsequent uplink slots of the CG frame pattern may be expressed as avgDistance=(Σdj)/N_arrivalTimes.

In some embodiments, the UE modem may calculate an avgDistance(i) for all possible initial offsets (i) during the uplink traffic period. In some embodiments, the uplink data arrival times may be periodic according to a traffic period of the uplink data transmitted by an application to the UE modem. In some embodiments, the UE modem may calculate the uplink data arrival times using a fixed step (e.g., one slot) or a configurable step that may be provided by the application. In such embodiments, the UE modem may receive from the application an indication of a timing of each of the two or more initial offset times based on the traffic period of the uplink data. In some embodiments, the UE modem may receive from the application an indication of possible timing of each possible initial offset. For example, if an uplink data traffic period is 4 ms, possible initial offsets may be {0, 0.5, 1, 1.5, 2, 2.5, 3, 3.5}. In some embodiments, each of the two or more offset times may correspond to the traffic period of the uplink data.

In some embodiments, the UE modem may provide to the application one or more parameters, such as the selected initial offset, and/or the average time between uplink data arrival times at the UE modem during the CG frame pattern and subsequent uplink slots of the CG frame pattern, via a cross-layer Application Programming Interface (API). In response to receiving the one or more parameters, the application may adjust the timing of uplink data provided to the modem, such as by adjusting an initial offset timing. In some embodiments, the application may select an initial offset that reduces the average time. In some embodiments, the application may select an initial offset that minimizes the average time.

FIG. 4B is a timing diagram illustrating a method 400b for managing uplink transmission latency according to various embodiments. In some embodiments, a modem (e.g., 252) of a UE (e.g., 120a-120e, 200, 320) may be configured to determine an appropriate CG frame pattern based on a determined uplink traffic arrival time (or times).

In some embodiments of the method 400b, uplink traffic (e.g., uplink traffic for an online gaming or XR application) may include the uplink traffic period 402 of 4 ms. In this example, the UE (e.g., the UE modem) may be configured to determine an average time between uplink data arrival times at the UE modem and subsequent uplink slots of two or more CG frame patterns, such as first CG frame pattern 450 and second CG frame pattern 452. The CG frame patterns 450 and 452 may each include an outer cycle of 20 ms, but may each have different inner cycles. For example, the CG frame pattern 550 may include an inner cycle having a first portion (#1) of 2 ms, a second portion (#2) of 5 ms, a third portion (#3) of 2.5 ms, and so forth, as illustrated, and the CG frame pattern 452 may have a first portion (#1) of 4.5 ms, a second portion (#2) of 2.5 ms, a third portion (#3) of 5 ms, and so forth, as illustrated.

In some embodiments, the UE may use the same initial offset time 454 for each of the CG frame patterns 450 and 452. The uplink data traffic may have an uplink traffic period 456 of 4 ms. In various embodiments, the UE (e.g., the UE modem) may be configured to determine an average time between uplink data arrival times at the UE modem during the CG frame patterns 450 and 452 and subsequent uplink slots of the CG frame patterns 450 and 452.

For example, for the first CG frame pattern 450, the UE may determine uplink data arrival times 458a, 458b, 458c, 458d, and 458e and a corresponding uplink slot (U) 460a, 460b, 460c, 460d, 460e subsequent to each of the uplink data arrival times. For example, the UE may determine that: the amount of time between the uplink data arrival time 458a and the subsequent uplink slot 460a is 3.25 ms 462a; the amount of time between the uplink data arrival time 458b and the subsequent uplink slot 460b is 1.75 ms 462b; the amount of time between the uplink data arrival time 458c and the subsequent uplink slot 460c is 2.75 ms 462c; the amount of time between the uplink data arrival time 458d and the subsequent uplink slot 460d is 1.25 ms 462d; and the amount of time between the uplink data arrival time 458e and the subsequent uplink slot 460e is 2.25 ms 462e. Based on the amounts of time 462a-462e between the uplink data arrival times 458a-458e and the subsequent uplink slots 460a-460e, the UE may determine an average time 2.25 ms 464, which represents an average time between the uplink data arrival times 458a-458e at the UE modem and subsequent uplink slots 460a-460e of the first CG frame pattern 450.

Continuing this example, for the second CG frame pattern 452, the UE may determine uplink data arrival times 468a, 468b, 468c, 468d, and 468e and a corresponding uplink slot (U) 470a, 470b, 470c, 470d, 470e subsequent to each of the uplink data arrival times 468a, 468b, 468c, 468d, and 468e. For example, the UE may determine that: the amount of time between the uplink data arrival time 468a and the subsequent uplink slot 470a is 0.75 ms 472a; the amount of time between the uplink data arrival time 468b and the subsequent uplink slot 470b is 4.25 ms 472b; the amount of time between the uplink data arrival time 468c and the subsequent uplink slot 470c is 2.75 ms 472c; the amount of time between the uplink data arrival time 468d and the subsequent uplink slot 470d is 3.75 ms 472d; and the amount of time between the uplink data arrival time 468e and the subsequent uplink slot 470e is 4.75 ms 472e. Based on the amounts of time 472a-472e between the uplink data arrival times 468a-468e and the subsequent uplink slots 470a-470e, the UE may determine an average time 3.25 ms 474, which represents an average time between the uplink data arrival times 468a-468e at the UE modem and subsequent uplink slots 470a-470e of the second CG frame pattern 452.

The UE may determine that the shortest average time (2.25 ms 464) is associated with the first GC frame pattern 450. The UE may select from among the two or more CG frame patterns (e.g., 450, 452) a CG frame pattern 450 corresponding to the shortest average time 464. In some embodiments, the UE modem may transmit an indication of the selected CG frame pattern 450 to the communication network to enable the transmission by the UE of the uplink data to the communication network according to the selected CG frame pattern. The UE modem may receive from the communication network a configuration message indicating the selected CG frame pattern. Based on the received configuration message, the UE modem may transmit the uplink data to the communication message according to the selected CG frame pattern. For conciseness and clarity, operations performed by the UE with respect to two CG frame patterns (450, 452) are illustrated in FIG. 4B, but this is not intended as a limitation, because the UE may perform similar operations for more CG frame patterns.

In some embodiments, the UE modem may be configured to calculate a length (duration) of the CG frame pattern (CG Length) as a lowest common multiple of a length (duration) of the CG frame pattern (e.g., 2.5 ms for a DDDSU pattern) and the uplink data traffic period. In some embodiments, the UE modem may initialize (generate) a bitmap (CG_Bitmap) having a length that indicates a number of uplink (U) slots during the CG frame pattern. The generated bitmap may indicate the selected CG frame pattern. It some embodiments, each bit of the bitmap may represent a candidate slot for CG uplink transmission in the CG frame pattern. The UE modem may calculate a number of arrival times (N) of uplink data (N_arrivalTimes) that may occur during the CG frame pattern. In some embodiments, for each arrival time j (from 1 to N_arrivalTimes), the UE modem may calculate a timing of each arrival time j relative to the start of the CG frame pattern, which may be expressed as Pos_j=InitialOffset+(j−1)*TrafficPeriod. In some embodiments, the UE modem may determine a next uplink (U) slot that is at least k2 min slots after Pos_j (modulo the length of the CG frame pattern). In some embodiments, the UE modem may set the corresponding bit in CG_Bitmap to 1.

In some embodiments, the UE modem may determine a length of each of the two or more CG patterns based on a length of a frame pattern and a traffic period of the uplink data. In some embodiments, the UE modem may receive from the communication network a CG frame pattern configuration following transmission of the selected CG frame pattern to the communication network, for example, via an RRC Reconfiguration message. In some embodiments, the communication network may use the bitmap (including bitmap length) for the configuration of the CG frame pattern. In some embodiments, the UE modem may transmit to the communication network a length of the CG frame pattern and a bitmap indicating the CG frame pattern. In some embodiments, the UE modem may transmit the selected CG frame pattern to the communication network via L3 signaling or L2 signaling.

FIG. 5A is a process flow diagram illustrating a method 500a that may be performed by a processor of a modem of a UE for managing uplink transmission latency in accordance with various embodiments. With reference to FIGS. 1A-5A, means for performing the operations of the method 500a may include a UE modem processor (e.g., the processor 252) or another suitable processor (such as the processor

210, 212, 214, 216, 218, 260) of a UE (such as the UE 120a-120e, 200, 320, 420), referred to generally herein as a "processor."

In block 502, the processor may determine for each of two or more initial offset times that indicate a first uplink data arrival time at a UE modem after a beginning of a CG frame pattern that is configured in the UE, an average time between uplink data arrival times at the UE modem during the CG frame pattern and subsequent uplink slots of the CG frame pattern. In some embodiments, the average time between uplink data arrival times at the UE modem during the CG frame pattern and subsequent uplink slots of the CG frame pattern may include an average quantity of slots of the CG frame pattern. In some embodiments, the CG frame pattern may be non-uniform. In some embodiments, the uplink data arrival times may be periodic according to a traffic period of the uplink data transmitted by an application to the UE modem. In some embodiments, each of the two or more offset times may correspond to a traffic period of the uplink data.

In block 504, the processor may select from among the two or more initial offset times an initial offset time corresponding to the shortest average time.

In block 506, the processor may receive the uplink data at the UE modem for transmission to a communication network according to the selected initial offset time.

FIG. 5B is a process flow diagram illustrating operations 500b that may be performed by a processor of a modem of a UE as part of the method 500a for managing uplink transmission latency in accordance with various embodiments. With reference to FIGS. 1A-5B, means for performing the operations 500b may include a UE modem processor (e.g., the processor 252) or another suitable processor (such as the processor 210, 212, 214, 216, 218, 260) of a UE (such as the UE 120a-120e, 200, 320, 420), referred to generally herein as a "processor."

In block 510, the processor may receive from the application an indication of a timing of each of the two or more initial offset times based on the traffic period of the uplink data. In some embodiments, the modem may receive from the application an indication of possible timing of each possible initial offset. For example, if an uplink data traffic period is 4 ms, possible initial offsets may be {0, 0.5, 1, 1.5, 2, 2.5, 3, 3.5}. In some embodiments, wherein each of the two or more offset times may correspond to a traffic period of the uplink data.

The processor may determine for each of two or more initial offset times that indicate a first uplink data arrival time at a UE modem after a beginning of a CG frame pattern that is configured in the UE, an average time between uplink data arrival times at the UE modem during the CG frame pattern and subsequent uplink slots of the CG frame pattern, in block 502 as described.

Figure 5C:
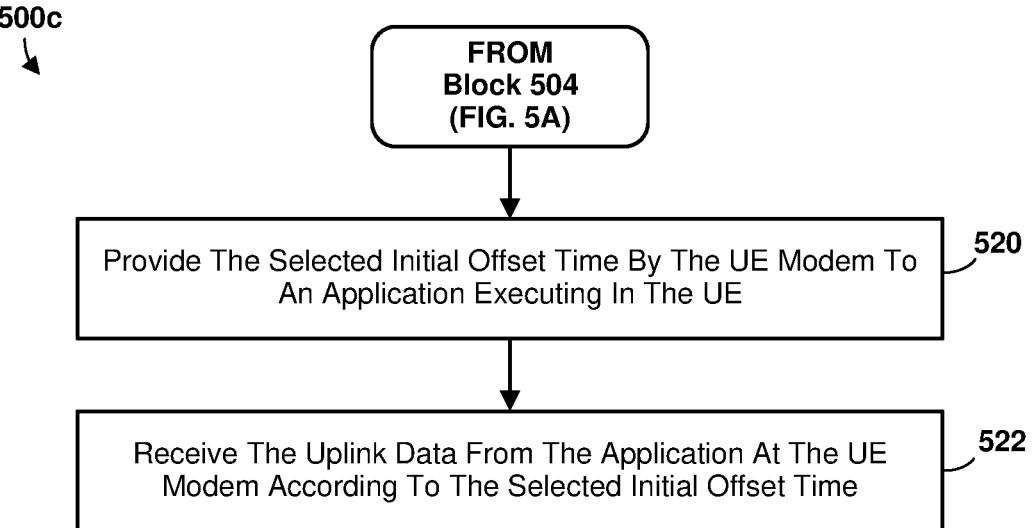

FIG. 5C is a process flow diagram illustrating operations 500c that may be performed by a processor of a modem of a UE as part of the method 500a for managing uplink transmission latency in accordance with various embodiments. With reference to FIGS. 1A-5C, means for performing the operations 500c may include a UE modem processor (e.g., the processor 252) or another suitable processor (such as the processor 210, 212, 214, 216, 218, 260) of a UE (such as the UE 120a-120e, 200, 320, 420), referred to generally herein as a "processor."

After the processor selects from among the two or more initial offset times an initial offset time corresponding to the shortest average time in block 504 as described, the processor may provide the selected initial offset time by the UE modem to an application executing in the UE in block 520.

In block 522, the processor may receive the uplink data from the application at the UE modem according to the selected initial offset time.

FIG. 6A is a process flow diagram illustrating a method 600*a* that may be performed by a processor of a modem of a UE for managing uplink transmission latency in accordance with various embodiments. With reference to FIGS. 1A-6A, means for performing the operations of the method 600*a* may include a UE modem processor (e.g., the processor 252) or another suitable processor (such as the processor 210, 212, 214, 216, 218, 260) of a UE (such as the UE 120*a*-120*e*, 200, 320, 420), referred to generally herein as a "processor."

In block 602, the processor may determine, by a UE modem for each of two or more CG frame patterns, an average time between uplink data arrival times at the UE modem and subsequent uplink slots of the CG frame patterns. In some embodiments, the processor may determine the length of each of the two or more CG patterns based on a length of a frame pattern and a traffic period of the uplink data.

In block 604, the processor may select from among the two or more CG frame patterns a CG frame pattern corresponding to the shortest average time.

In block 606, the processor may transmit the selected CG frame pattern to a communication network to enable the transmission of the uplink data to the communication network according to the selected CG frame pattern. In some embodiments, the processor may transmit to the communication network a length of the CG frame pattern and a bitmap indicating the CG frame pattern. In some embodiments, the processor may transmit the selected CG frame pattern to the communication network via L3 signaling (e.g., via RRC UE Assistance Information) or L2 signaling (e.g., via a MAC Control Element (MAC CE).

Figure 6B:
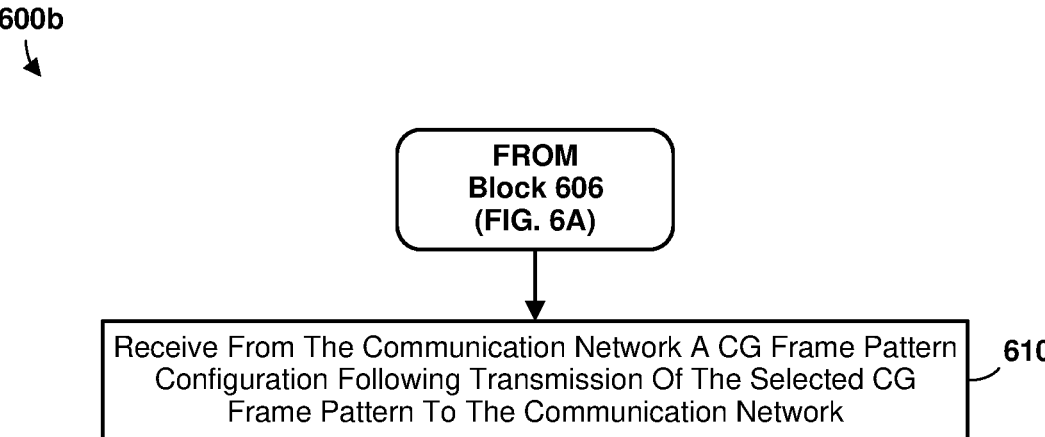
FIG. 6B is a process flow diagram illustrating operations that may be performed by a processor of a UE modem as part of the method for managing uplink transmission latency in accordance with various embodiments.

FIG. 6B is a process flow diagram illustrating operations 600*b* that may be performed by a processor of a UE modem as part of the method 600*a* for managing uplink transmission latency in accordance with various embodiments. With reference to FIGS. 1A-6B, means for performing the operations 600*b* may include a UE modem processor (e.g., the processor 252) or another suitable processor (such as the processor 210, 212, 214, 216, 218, 260) of a UE (such as the UE 120*a*-120*e*, 200, 320, 420), referred to generally herein as a "processor."

After transmitting the selected CG frame pattern to a communication network to enable the transmission of the uplink data to the communication network according to the selected CG frame pattern in block 606 as described, the processor may receive from the communication network a CG frame pattern configuration following transmission of the selected CG frame pattern to the communication network in block 610.

Figure 7:
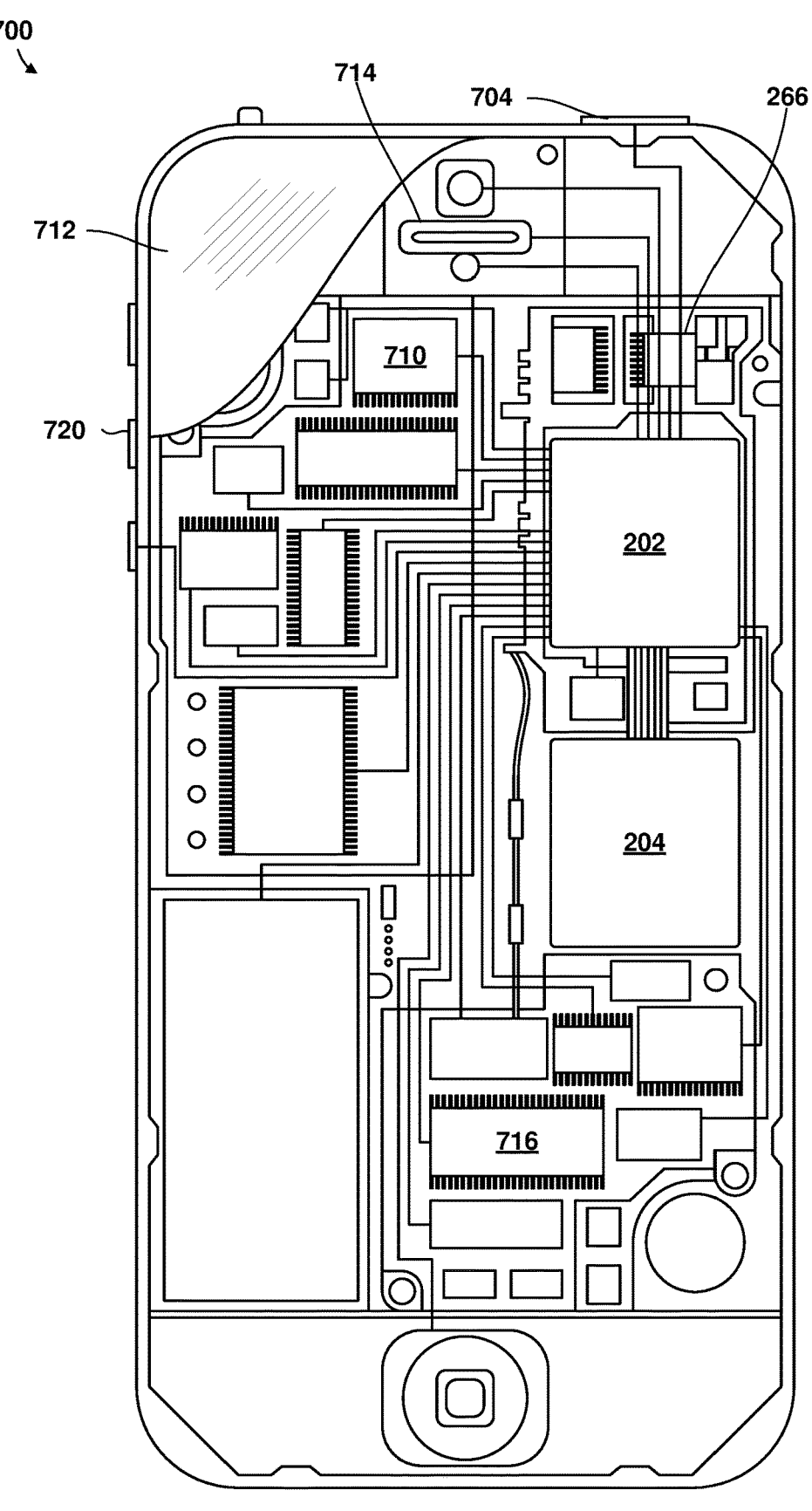
FIG. 7 is a component block diagram of a UE suitable for use with various embodiments.

FIG. 7 is a component block diagram of a UE 700 suitable for use with various embodiments. With reference to FIGS. 1A-7, various embodiments may be implemented on a variety of UEs 700 (for example, the UEs 120*a*-120*e*, 200, 320, 420), an example of which is illustrated in FIG. 7 in the form of a smartphone. The UE 700 may include a first SOC 202 (for example, a SOC-CPU) coupled to a second SOC 204 (for example, a 5G capable SOC). The first and second SOCs 202, 204 may be coupled to internal memory 716, a display 712, and to a speaker 714. Additionally, the UE 700 may include an antenna 704 for sending and receiving electromagnetic radiation that may be connected to a wireless transceiver 266 coupled to one or more processors in the first and/or second SOCs 202, 204. The UE 700 may include menu selection buttons or rocker switches 720 for receiving user inputs. The UE 700 may include a sound encoding/decoding (CODEC) circuit 710, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 710 may include a digital signal processor (DSP) circuit (not shown separately).

Figure 8:
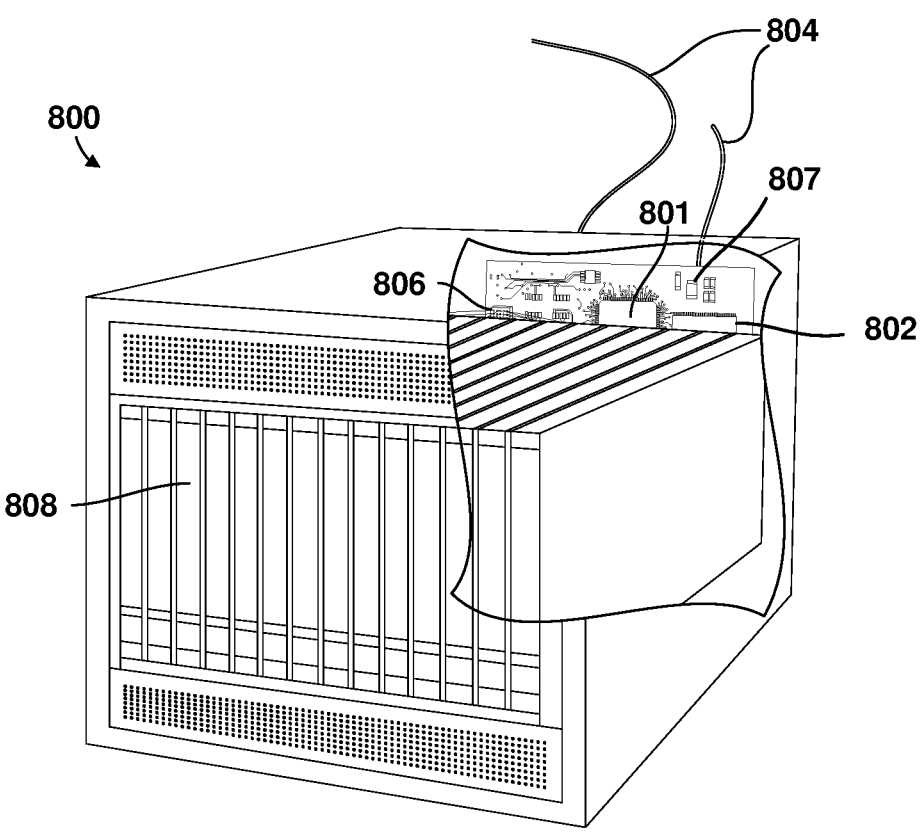
FIG. 8 is a component block diagram of a network device suitable for use with various embodiments.

FIG. 8 is a component block diagram of a network device suitable for use with various embodiments. Such network devices (e.g., network device 110*a*-110*d*, 350, 406, 410, 414) may include at least the components illustrated in FIG. 8. With reference to FIGS. 1A-8, the network device 800 may typically include a processor 801 coupled to volatile memory 802 and a large capacity nonvolatile memory, such as a disk drive 808. The network device 800 also may include a peripheral memory access device 806 such as a floppy disc drive, compact disc (CD) or digital video disc (DVD) drive coupled to the processor 801. The network device 800 also may include network access ports 804 (or interfaces) coupled to the processor 801 for establishing data connections with a network, such as the Internet or a local area network coupled to other system computers and servers. The network device 800 may include one or more antennas 807 for sending and receiving electromagnetic radiation that may be connected to a wireless communication link. The network device 800 may include additional access ports, such as USB, Firewire, Thunderbolt, and the like for coupling to peripherals, external memory, or other devices.

The processors of the UE 700 and the network device 800 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 716, 808 before they are accessed and loaded into the processor. The processors may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations disclosed herein may be substituted for or combined with one or more operations of the methods and operations disclosed herein.

Implementation examples are described in the following paragraphs. While some of the following implementation examples are described in terms of example methods, further example implementations may include: the example methods discussed in the following paragraphs implemented by a UE including a processor (e.g., a modem processor) configured with processor-executable instructions to perform operations of the methods of the following implementation examples; the example methods discussed in the following paragraphs implemented by a UE including means for performing functions of the methods of the following implementation examples; and the example methods discussed in the following paragraphs may be implemented as a non-transitory processor-readable storage medium having stored thereon processor-executable instructions configured to cause a processor of a UE (e.g., a modem processor) to perform the operations of the methods of the following implementation examples.

Example 1. A method of managing uplink transmission latency, including: determining, for each of two or more initial offset times that indicate a first uplink data arrival time at a user equipment (UE) modem after a beginning of a configured grant (CG) frame pattern that is configured in the UE, an average time between uplink data arrival times at the UE modem during the CG frame pattern and subsequent uplink slots of the CG frame pattern; selecting from among the two or more initial offset times an initial offset time corresponding to the shortest average time; and receiving uplink data at the UE modem for transmission to a communication network according to the selected initial offset time.

Example 2. The method of example 1, in which the average time between uplink data arrival times at the UE modem during the CG frame pattern and subsequent uplink slots of the CG frame pattern includes an average quantity of slots of the CG frame pattern.

Example 3. The method of either example 1 or example 2, in which the CG frame pattern is non-uniform.

Example 4. The method of any of examples 1-3, in which the uplink data arrival times are periodic according to a traffic period of the uplink data transmitted by an application to the UE modem.

Example 5. The method of example 4, further including receiving by the UE modem from the application an indication of a timing of each of the two or more initial offset times based on the traffic period of the uplink data.

Example 6. The method of any of examples 1-5, in which each of the two or more offset times corresponds to a traffic period of the uplink data.

Example 7. The method of any of examples 1-6, in which receiving the uplink data at the UE modem for transmission to the communication network according to the selected initial offset time includes: providing the selected initial offset time by the UE modem to an application executing in the UE; and receiving the uplink data from the application at the UE modem according to the selected initial offset time.

Example 8. A method of managing uplink transmission latency, including: determining, by a user equipment (UE) modem for each of two or more configured grant (CG) frame patterns, an average time between uplink data arrival times at the UE modem and subsequent uplink slots of the CG frame patterns; selecting from among the two or more CG frame patterns a CG frame pattern corresponding to the shortest average time; and transmitting the selected CG frame pattern to a communication network to enable the transmission of uplink data to the communication network according to the selected CG frame pattern.

Example 9. The method of example 8, in which determining, for each of the two or more CG patterns, the average time between uplink data arrival times at the UE modem and the subsequent CG of each CG pattern includes determining a length of each of the two or more CG patterns based on a length of a frame pattern and a traffic period of the uplink data.

Example 10. The method of either of examples 8 or 9, further including receiving from the communication network a CG frame pattern configuration following transmission of the selected CG frame pattern to the communication network.

Example 11. The method of any of examples 8-10, in which transmitting the selected CG frame pattern to the communication network includes transmitting to the communication network a length of the CG frame pattern and a bitmap indicating the CG frame pattern.

Example 12. The method of any of examples 8-11, in which transmitting the selected CG frame pattern to the communication network includes transmitting the selected CG frame pattern to the communication network via L3 signaling or L2 signaling.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running in a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of managing uplink transmission latency, comprising:
   determining, for each of two or more initial offset times that indicate a first uplink data arrival time at a user equipment (UE) modem after a beginning of a configured grant (CG) frame pattern that is configured in the UE, an average time between uplink data arrival times at the UE modem during the CG frame pattern and subsequent uplink slots of the CG frame pattern;
   selecting from among the two or more initial offset times an initial offset time corresponding to the shortest average time; and
   receiving uplink data at the UE modem for transmission to a communication network according to the selected initial offset time.

2. The method of claim 1, wherein the average time between uplink data arrival times at the UE modem during the CG frame pattern and subsequent uplink slots of the CG frame pattern comprises an average quantity of slots of the CG frame pattern.

3. The method of claim 1, wherein the CG frame pattern is non-uniform.

4. The method of claim 1, wherein the uplink data arrival times are periodic according to a traffic period of the uplink data transmitted by an application to the UE modem.

5. The method of claim 4, further comprising receiving by the UE modem from the application an indication of a timing of each of the two or more initial offset times based on the traffic period of the uplink data.

6. The method of claim 1, wherein each of the two or more offset times corresponds to a traffic period of the uplink data.

7. The method of claim 1, wherein receiving the uplink data at the U E modem for transmission to the communication network according to the selected initial offset time comprises:
   providing the selected initial offset time by the UE modem to an application executing in the UE; and
   receiving the uplink data from the application at the UE modem according to the selected initial offset time.

8. A user equipment (UE), comprising:
   a transceiver;
   an application processor; and
   a modem coupled to the transceiver and the application processor, wherein the modem is configured to:
   determining, for each of two or more initial offset times that indicate a first uplink data arrival time at the modem after a beginning of a configured grant (CG) frame pattern that is configured in the U E, an average time between uplink data received from the application processor during the CG frame pattern and subsequent uplink slots of the CG frame pattern;

select from among the two or more initial offset times an initial offset time corresponding to the shortest average time; and receive uplink data from the application processor for transmission to a communication network according to the selected initial offset time.

9. The UE of claim 8, wherein the average time between uplink data arrival times at the modem during the CG frame pattern and subsequent uplink slots of the CG frame pattern comprises an average quantity of slots of the CG frame pattern.

10. The UE of claim 8, wherein the CG frame pattern is non-uniform.

11. The UE of claim 8, wherein the uplink data arrival times are periodic according to a traffic period of the uplink data provided by an application executing on the application processor to the modem.

12. The UE of claim 11, wherein the modem is further configured to receive from the application an indication of a timing of each of the two or more initial offset times based on the traffic period of the uplink data.

13. The UE of claim 8, wherein each of the two or more offset times corresponds to a traffic period of the uplink data.

14. The UE of claim 8, wherein the modem is further configured to provide the selected initial offset time by the modem to an application executing on the application processor.

\* \* \* \* \*